Figure 1:
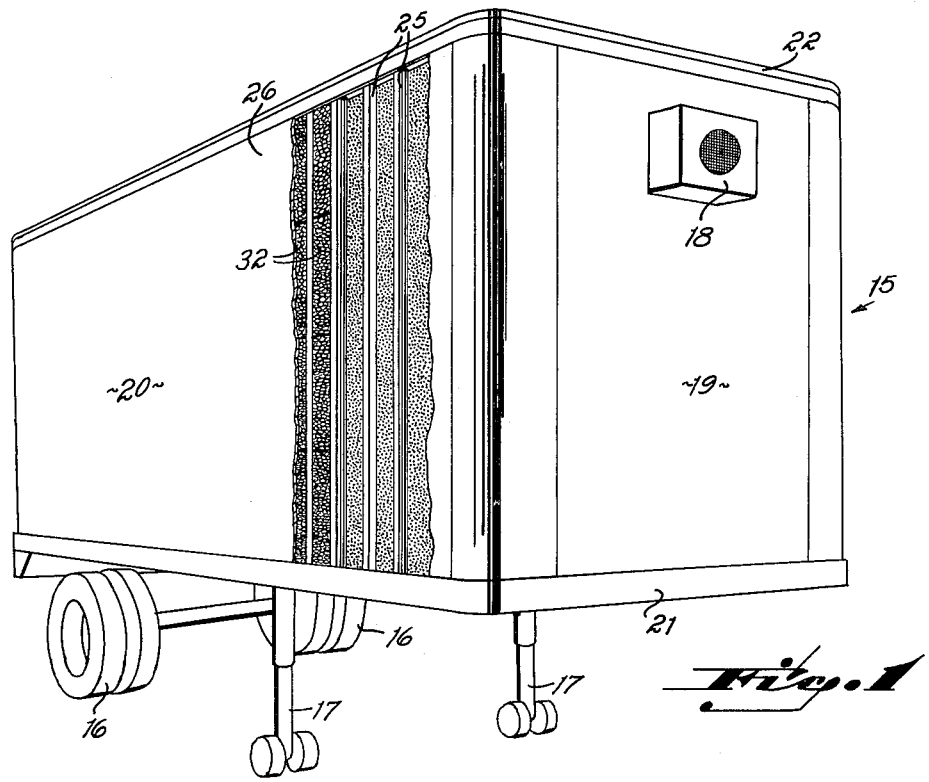

March 29, 1966 D. G. TILLINGHAST 3,242,625
SPACER FOR INSULATED WALL STRUCTURE
Filed Jan. 16, 1963 3 Sheets-Sheet 1

INVENTOR.
David G. Tillinghast
BY
Wood, Herron and Evans
ATTORNEYS

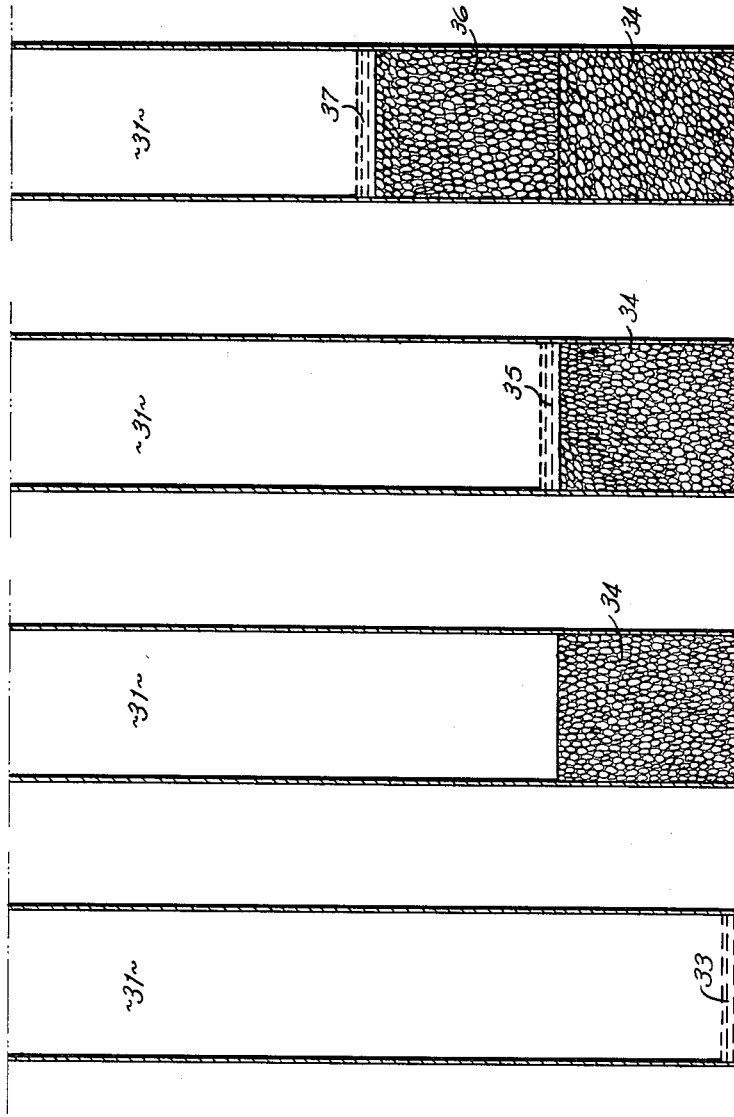

March 29, 1966 D. G. TILLINGHAST 3,242,625
SPACER FOR INSULATED WALL STRUCTURE
Filed Jan. 16, 1963 3 Sheets-Sheet 3
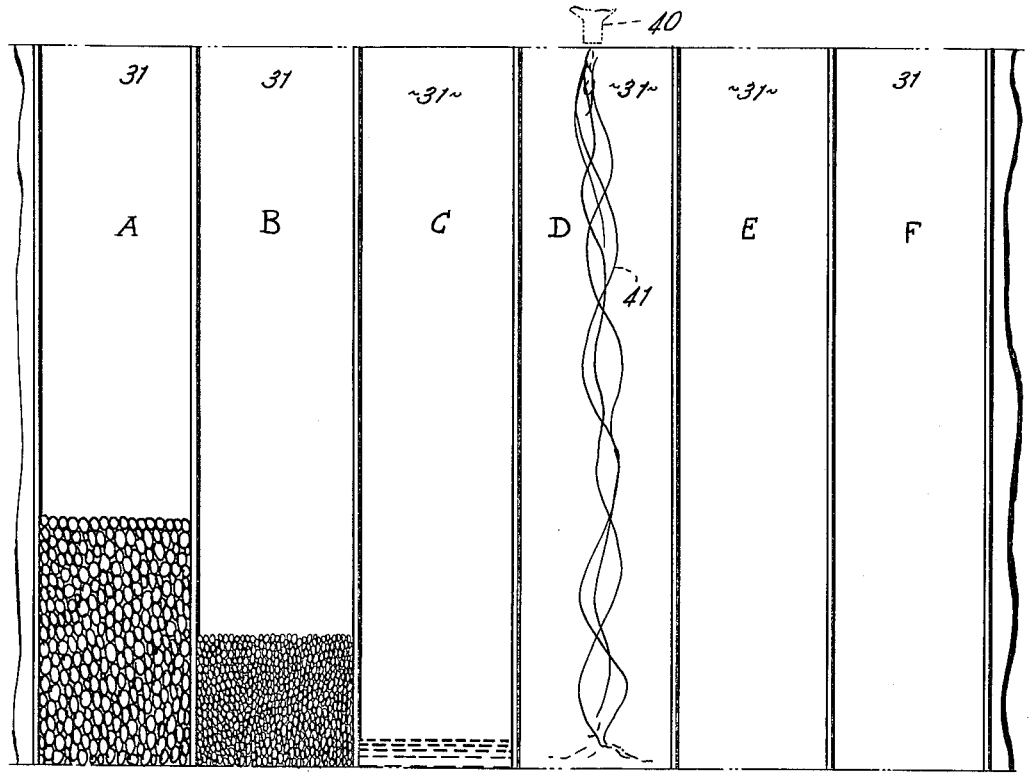
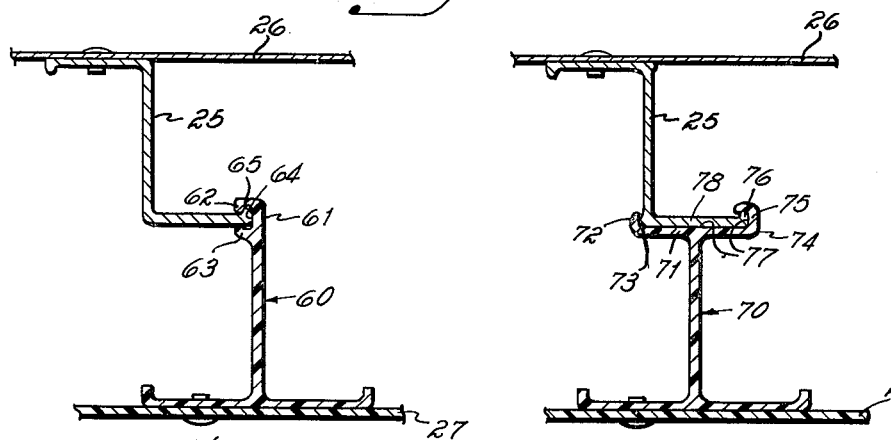
INVENTOR.
David G. Tillinghast
BY
Wood, Herron and Evans
ATTORNEYS

United States Patent Office 3,242,625
Patented Mar. 29, 1966

3,242,625
SPACER FOR INSULATED WALL STRUCTURE
David G. Tillinghast, Cincinnati, Ohio, assignor to Pullman Incorporated, Cincinnati, Ohio, a corporation of Delaware
Filed Jan. 16, 1963, Ser. No. 251,920
2 Claims. (Cl. 52—461)

This invention relates to insulated wall structures, and more particularly the invention is directed to the insulating of the walls of refrigerated cargo bodies.

The walls of a refrigerated cargo body are usually constructed of a series of spaced, vertical posts having an outer skin secured to them, the outer skin preferably being of thin aluminum sheet metal. On the inside of the cargo body, thin panels forming an inside liner are mounted in a suitable manner on the posts, the panels being spaced outwardly from each post by a number of wooden spacer elements. Between the outer skin and the inner liner is an air space which is coextensive with the cargo body wall and which may be several inches thick.

A dead air space is a highly satisfactory insulator in that air has the quality of resisting the transfer of heat to a high degree. However, a completely dead air space is almost impossible to obtain. In a large space such as that within a cargo body wall and under the conditions in which a cargo body operates, air proves very unsatisfactory as a heat insulator because of the occurrence of convection currents. The difference in temperature between the inside and outside of a cargo body may be as much as approximately 100° F. Further, there are temperature differences along the length and height of a cargo body wall. These temperature differences cause the air within the cargo body to move, and in moving, the air currents convey the heat from the cargo body skin to the inside liner of the cargo body wall.

It is therefore desirable and common practice to introduce into the space between the outer skin and inner liner a substance of low heat transfer quality. One such material which has proven highly satisfactory as an insulator is foamed plastic, for example, foamed polyurethane. This material can be introduced into a space in a liquid form, and, in a very few seconds, it will expand to occupy approximately twenty times its original volume to form a multicellular structure.

It has been the practice in manufacturing cargo body walls to introduce the material into the top of a wall in that quantity which, when expanded, will completely fill the wall. The tendency of the material, upon foaming, is to expand three-dimensionally. In so doing, this rather considerable block of material exerts a pressure which may be as high as 3 p.s.i. against the panel and outer skin of the cargo body and tends to bulge or bow that wall structure outwardly. It has been the practice to resist that tendency of bowing of the wall structure by first applying bracing over the entire area of the wall, both against the outer skin and against the inner panels.

Another problem attending the present practices of introducing foaming plastic into a cargo body wall is the difficulty of forming a substantially homogenous block of insulation within the wall. A number of factors contribute to the difficulty. These factors include the weight of the insulative material, the pressure which it develops and exerts against the surfaces of the wall, the frictional drag of the material against the wall surfaces as the material tends to rise upon expansion. In some instances the foaming material rises so non-uniformly that sizable voids, occupied by no foam at all, are left in the wall. Further, the resultant plastic foam is more dense in the lower portion of the wall than in the upper portion. The individual cells in the lower portion of the wall tend to be generally spherical, whereas the cells in the upper portion of the wall tend to elongate in a vertical direction. The elongation of the cells becomes progressively greater toward the top of the walls. If the cell walls elongate to too great an extent, the foam becomes thin, brittle, and lacks the desired structural quality.

Some elongation of the cells, however, of itself, has some desirable attributes. The resistance to heat transfer in a direction transverse to the elongated cells is approximately twenty percent superior to the resistance in a generally spherical cell structure. It is therefore desirable to have a sufficient cell elongation in the direction of the major plane of the wall to be insulated, the elongation, however, being insufficiently great to impair the structural quality of the insulation.

In the prior method of introducing the foam, a hose through which the foamable material is introduced would begin at one end of the trailer wall and make a pass to the other end of the trailer wall, and during that pass introduce the desired quantity of foaming material. The material, however, starts to foam immediately upon its introduction and is in a highly fluid state so that it flows along the bottom of the trailer wall faster than the supplying hose moves in its pass from one end of the wall to the other. Consequently, the material is introduced initially to the bottom of the trailer wall, but as the supply hose moves toward the end of the trailer wall, the supply nozzle pours fresh material onto partially foamed material. Thus, the foam is introduced under one set of conditions at one end of the wall and under an entirely different set of conditions at the other end of the wall, all of which contributes greatly to a lack of homogeneity and a lack of ability to control the foaming process as described above.

It has been an objective of the invention of the co-pending application of George Heffner, serial No. 251,969 filed January 16, 1963 to provide an improved wall structure and method of introducing a foaming plastic into the wall. That invention contemplates the compartmentalizing of the walls into a series of narrow, vertically extending compartments which are physically isolated from each other by the posts and spacers. That invention further contemplates the introduction of the foaming material into the individual compartments incrementally, that is, through the use of multiple pours in each compartment.

The combination of the compartmented wall structure and the incremental pouring steps has a number of economical advantages and results in a wall structure of superior insulating properties. By foaming in small increments, it is possible to exercise that control over the formation of the cell structure which is required to produce an insulating block having the optimum structural, as well as insulative, qualities. In other words, the process of foaming a small increment of material reduces the effect of the factors such as weight, frictional drag, and the like. The use of the comparatively narrow compartments prevents the development of such a considerable transverse pressure as tends to bow the outer skin and inner panels of the walls. As a consequence, the requirement of applying external bracing to the wall prior to the introduction of the plastic is eliminated. Another advantage resulting from the invention resides in the improved homogeneity of the resultant insulative material and particularly in the elimination of large voids and the like.

Since, for structural reasons, it is desirable to manufacture the cargo body walls with an outer skin of metal supported by metallic posts, the skin and posts preferably being aluminum, there is a possibility of an undesirably large amount of heat passing into the cargo body through the highly conductive skin and posts. It is, therefore, desirable to isolate the posts from the cargo body liner by attaching to the inner edge of each post a plastic spacer of low thermal conductivity.

It has been an objective of the invention to provide means for attaching a plastic spacer to a supporting post by providing a specially configured edge on the spacer which is adapted to snap onto the inner edge of the post and thereby to form a resilient clamp of the spacer to the post. This construction results in the elimination of the need for riveting the spacer along its length to the post. By way of example, the riveting of each spacer may require a rivet hole in the spacer and post every several inches along their lengths. A 38-foot long cargo body which may be 12 feet high and have spacers attached at every foot along the length of the cargo body would require the application of around 1,000 rivets. The elimination of the need for drilling all of the holes required and installing of all the rivets effects an appreciable saving in the cost of each trailer.

It has been still another objective of the invention to provide a snap-on attachment portion for a spacer having a jaw which extends around a flange or bead on the post to which it is attached in such a manner as to resist the stress tending to remove the spacer from the post, the stress being applied by the expanding foam material.

The expanding foam creates a problem at the joint between adjacent liner panels. When introduced, the foamable material is quite fluid and retains its fluidity to some degree until it has completely expanded and rigidified. During the expansion of the material, it applies a pressure against the structure which encases it, and that pressure tends to force the material to flow through any available crevices in the encasing structure. In a cargo body wall, a major crevice through which the material tends to flow is that crack formed between abutting panels, the crack extending the full height of the inside of the cargo body wall.

It has been an objective of the invention to provide a spacer and retainer combination, the spacer having an edge configured to overlie the crack formed by adjacent panel edges. The retainer has a batten portion overlying the opposite side of the crack and has a tongue portion projecting through the crack which is adapted to snap into engagement with the spacer. More particularly, that portion of the spacer which overlies the crack is formed of two legs which straddle the crack and which resiliently clamp over a bead at the edge of the retainer tongue. Preferably, the configuration of the legs is such that the expansion of the foamable material tends to squeeze the legs into ever tighter engagement with the retainer tongue so that any increase of pressure tending to force the tongue out of engagement with the spacer legs is countered by an increasing clamping force of the legs on the retainer tongue.

The combination of spacer and retainer results in too tortuous a path over which the foamable material must flow for it to escape into the interior of the cargo body. Further, a spacer and retainer eliminates the need for an overlapping joint between adjacent panels and further eliminates the need for riveting the panels to the spacer or post. While it is current practice to use fiber glass panels which are approximately 4 feet wide, the panels being riveted to the spacers between the edges, it should be apparent that the panels could be only as wide as the distance between adjoining posts, each panel being attached to the post by means of the spacer and retainer combination. In this way, substantially all of the riveting now required for mounting the panels to the posts could be eliminated.

Figure 2:
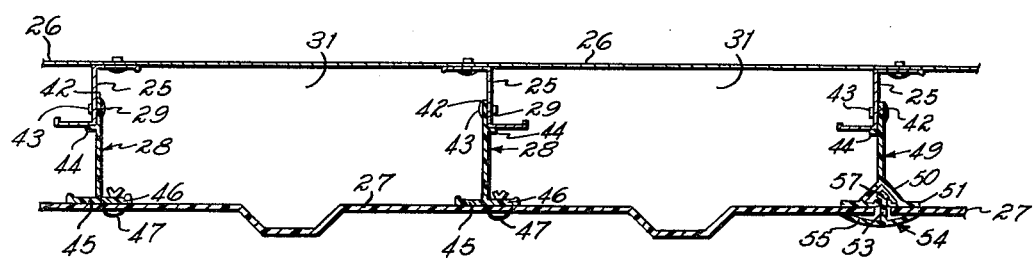
Figure 3:
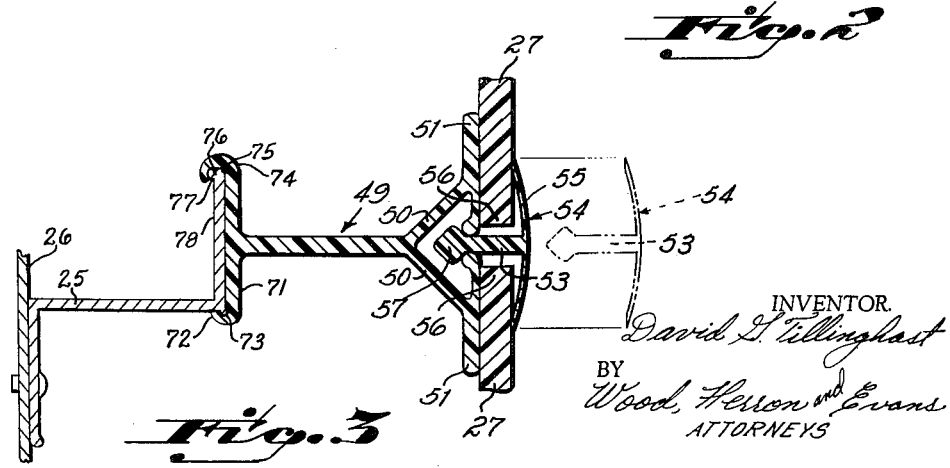

These and other objectives of the invention will become more readily apparent from the following detailed decription taken in conjunction with the accompanying drawings in which:

FIG. 1 is a perspective view of a semi-trailer cargo body with wall and insulation portions broken away to illustrate the use of the invention, FIG. 2 is a fragmentary cross-sectional view through a portion of the wall, FIG. 3 is an enlarged cross-sectional view illustrating the manner in which panel joints are formed, FIGS. 4 to 7 are diagrammatic views illustrating the steps of introducing foaming mtaerial, FIG. 8 is a diagrammatic view illustrating one mode of utilizing the invention in insulating a cargo body wall, FIG. 9 is a cross-sectional view through a portion of the wall to show an alternative spacer, and FIG. 10 is a cross-sectional view similar to FIG. 9 showing a further alternative spacer.

In FIG. 1, there is shown a refrigerated cargo body 15 in the form of a semi-trailer supported on rear wheels 16 and landing gears 17 in a known manner. A refrigeration unit 18 is mounted on a front wall 19 of the cargo body. The cargo body has side walls 20, a bottom wall 21, a top wall 22 and rear swinging doors, not shown, forming the major portion of the rear wall. All of the walls including the top and bottom walls are insulated, although the manner in which the insulation is introduced into the top and bottom walls may differ from the manner in which it is introduced into the side and end walls.

The vertical walls of the cargo body are supported principally by a plurality of vertical Z-section posts 25 which are spaced from each other on 12-inch centers. An outer skin 26, preferably of sheet aluminum, is riveted to the Z-section posts 25. An inner liner structure 27 which preferably is of fiber glass panels is attached to plastic spacers 28 which are in turn attached as at 29 to the posts 25. The spacer structure will be described in detail below.

The posts 25 and associated spacers 28 divide the cargo body wall into a series of vertical compartments 31. These compartments are filled with an insulating foam material 32 which is preferably a foamed polyurethane resin.

A certain criticality attaches to the distance between adjacent posts. If they are too close together, the number of posts required is far greater than that needed for the support of the walls and hence is uneconomical. On the other hand, if the posts are spaced too far apart, as for example on 16-inch centers, then the pressure of the foaming material becomes so great as to tend to bow the outer skin and inner panels from which the wall is constructed. To avoid the bowing would require the use of thicker and consequently more uneconomical materials for the outer skin and inner liner.

As a matter of convenience in the construction of a cargo body, the wall structures are substantially completely formed prior to the introduction of the insulating material. Preferably, the outer roof skin is omitted so as to provide access for pouring foaming material into the side walls.

When the construction of the cargo body, except for the outer roof skin, is completed, the foaming material is introduced into the side and end walls while the cargo body is erect. The manner in which the material is introduced forms a part of the present invention and will be described in detail below. Thereafter, the trailer is pivoted slightly on a longitudinal axis to cant the top and bottom walls at an angle of approximately 15°. This angle permits the foaming material to flow from one end of the walls to the other, and thereafter to expand and thereby fill the wall.

The manner in which the foam is introduced into the compartments 31 of the side walls is best illustrated in FIGS. 4 to 7. As shown in FIG. 4, the material is first introduced in a liquid form 33. Within a very few seconds, a reaction begins and causes the material 33 to expand and form a multicellular structure indicated at 34 in FIG. 5. The amount of material introduced at 33 should be sufficient only to form a resultant foam block filling approximately one-fourth to one-third the height of the compartment 31 which would be about three or four feet high. After the reaction has ceased, a second increment of foaming material 35 is introduced on top of the block 34. After it has expanded to form a second block 36, still another batch of material 37 is introduced on top of the block 36 and permitted to expand. As indicated, three or four such batches or increments of foaming material are used to fill completely a single compartment of a cargo body.

It can be appreciated that by the use of small batches of foaming material the factors which normally tend to result in an imperfect insulation are minimized. For example, the weight which the foam must drive upwardly is cut to one-third or one-fourth of what it would be if the complete compartment were filled with one dose of the material. The frictional drag of the foaming material against the surfaces forming the compartment is similarly markedly reduced. The pressure which tends to bulge the sheet components forming the wall is reduced. The tendency to form unfilled voids is substantially eliminated.

Referring to FIG. 8, there is illustrated a preferred method of insulating a cargo body wall. FIG. 8 shows a plurality of compartments 31 side by side. A nozzle 40 through which liquid foaming material 41 is introduced is shown in broken lines. The respective compartments are lettered A through F for the purpose of describing the process. A batch of foamable material is first introduced into the compartment A, and thereafter successively into compartments B through F as illustrated. While the material 41 is being poured into the successive compartments, the earlier filled compartments are undergoing the foaming process which will be completed by the time the pouring nozzle has reached the end of the cargo body wall. Thereafter, the nozzle is returned to compartment A and a second batch of material is poured into compartment A and the succeeding compartments, as before. The process is repeated a third or a fourth time in order to fill each compartment completely.

There is practically no waste of time in moving from compartment to compartment, for no more than ten seconds should elapse between successive pourings in order to avoid the foaming and consequent blocking of the nozzle 40. With each pour, the nozzle flushes itself and thereby minimizes the need for repeated cleaning.

*Spacer structure*

As illustrated in FIGS. 1 to 3, each spacer 28 is an elongated strip having an inner edge portion 42 which is secured by rivets 43 to the aluminum post 25. The strips may be of any suitable plastic material such as polyethylene. The plastic material should be, compared to the aluminum from which the posts are made, of low thermal conductivity. Consequently, the strips serve to thermally isolate the panels 27 from the posts 25 and the outside skin 26. The spacers at their inner edges 42 are formed with shoulders 44 which abut the innermost surface of the posts 25 and serve to fix the distance from which the spacers will project from the posts, and in turn fix the spacing of the inner liner 27 from the outer skin 26.

The inner liner 27 which the spacers support may be formed of panel sections, each of which is, for example, four feet wide. The spacers 28 are T-shaped in cross-section at the edges 45 which engage the surface of the liner panels. The T-section provides flanges 46, either or both of which may be secured to the panel surface by blind rivets 47.

At the vertical joint between adjoining panels, a spacer 28 may be used. However, because the pressure of the expanding material is so great that it tends to force its way out of even the smallest crevices, if the T-section spacer is used, it is necessary to overlap the panels in order to minimize the oozing out of the foaming material. This problem can be eliminated through the use of a Y-section spacer 49 at the joints, as best illustrated in FIG. 3. The Y-section spacer is of a low thermal conductivity plastic, as is spacer 28, and has a bifurcated edge formed by legs 50. The ends of the legs 50 are terminated in flanges 51 which engage the edge portions of the adjoining panels. The adjacent edges of the flanges 51 resiliently engage an inwardly projecting tongue 53 of a lining retainer 54. One edge of the tongue is integral with a curved batten 55 which overlies the adjoining edges 56 of the adjacent panels. The opposite edge of the tongue 53 is enlarged as at 57 so as to be held against the inner edges of the flanges 51.

In the use of the Y-section spacer and lining retainer, the panel edges are brought across to abutment leaving a space sufficient to permit the passage of the retainer tongue 53. When the retainer is applied, the enlarged portion 57 spreads the flanges 51 of the spacer apart, the flanges crossing on the tongue after the retainer is in position. The resilience of the spacer is sufficiently great to hold the tongue in position against the force applied by the foaming material. It should be noted, however, that, in foaming, the material will apply a pressure of up to three pounds per square inch on the surface of the legs 50 of the Y-section spacer and tend to force them together, thereby increasing the retaining pressure on the tongue 53.

The inner edges of the T-section spacer 28 and the Y-section spacer 49 have been shown in FIGS. 2 and 3 as being riveted to the posts 25. In the embodiment of FIGS. 9 and 10, a different, more convenient, attaching structure is illustrated. The illustrations show the T-section spacer, but it should be understood that the attachment is equally applicable to the Y-section spacer.

In FIG. 9, there is shown a spacer 60 having an inner edge 61 which is C-shaped in cross-section to provide jaws 62 and 63 forming an elongated receptacle 64 therebetween. These jaws engage a bead 65 on the edge of the post 25 to snap the bead 65 into the receptacle 64. The spacer is attached to the edge of the post by hooking the jaw 62 on the bead 65 and pivoting the spacer to the desired position, whereby the jaw 63 slips over the bead 65 and holds the spacer in the proper position until the panel is applied.

In FIG. 10, a spacer 70 is shown having a flange 71 along its inner edge. As viewed in FIG. 10, the left end of the flange 71 has a hook-shaped jaw 72 which engages a bead 73 at the inward corner of the post 25. The right-hand edge 74 of the flange 71 has a hook-shaped jaw 75 which engages a bead 76 on the extreme edge of the post 25. The hook-shaped jaws 72 and 75 form a receptacle 77 which receives the flange 78 on the edge of post 25. The spacer 70 is attached by holding it in an angulated position and by applying the hook 75 to the bead 76. Then the spacer is swung or pivoted about the bead 76 to bring the hook 72 over the bead 73, thereby fixing the spacer in the proper position.

The hook confirmation of the inner edges of the spacers in both FIGS. 9 and 10 provides a sufficiently secure engagement of the spacer with the post to resist the tensile stress applied to the spacer during foaming, which tends to separate the spacer from the post. The snap-on spacers effect a considerable saving in the construction of the cargo body walls in eliminating the need for riveting the spacers to the post.

Having described my invention, I claim:

1. Spacer and retainer means of heat insulating material interconnecting an outer non-insulating wall post with a pair of adjacent generally coplanar heat insulating wall sections having slightly spaced generally parallel edges, said means comprising an elongated spacer element having a pair of opposed end portions, the one end portion having along its length an end attachment means attaching the one end portion of the spacer element with the post and the other end portion having along its length a pair of diverging generally equal end leg sections to define a retainer end portion receptacle, each leg section having at its free end an end flange transverse thereto and in flush engagement with a respective wall section, each flange lying generally in a common plane and having a first end extending in a direction away from said receptacle and a second end extending over the retainer end portion receptacle towards but spaced from its counterpart on the other leg to define a generally elongated passageway, said second end being flexible and deflectable into the receptacle, an elongated generally T-shaped retainer attached to said spacer, said retainer having a tongue extending between said spaced panel edges into said receptacle and a generally bowed resilient batten extending across one end of said tongue and overlying the spaced edges of said wall sections, said tongue having an enlargement on the end opposite from the batten, said enlargement being of greater transverse dimension than said passageway whereby said second flange ends serve to retain said tongue in said receptacle, said batten being held in tension flexed position whereby said batten serves to hold said sections in firm engagement with said flanges.

2. The invention according to claim 1 and said attachment means comprising a pair of spaced apart flexible jaws adapted to fit over and around at least part of the post in a snap-fitting action.

References Cited by the Examiner

UNITED STATES PATENTS

| | | | |
|---|---|---|---|
| 2,073,278 | 3/1937 | Hohl | 52—461 |
| 2,108,885 | 2/1938 | Griebsch | 52—481 |
| 2,356,008 | 8/1944 | Schafer | 296—31 |
| 2,438,140 | 3/1948 | Anten | 52—464 |
| 2,560,269 | 7/1951 | Berner | 169—2 |
| 2,582,862 | 1/1952 | Frykdahl | 220—15 |
| 2,627,949 | 2/1953 | Willson | 52—461 |
| 2,708,052 | 5/1955 | Eck | 220—15 |
| 2,858,580 | 11/1958 | Thompson et al. | 296—31 |
| 3,045,293 | 7/1962 | Potchen | 52—309 |
| 3,049,195 | 8/1962 | Leat et al. | 189—34 |
| 3,062,337 | 11/1962 | Zittle | 52—404 |
| 3,199,258 | 8/1965 | Jentoft | 52—282 |

FOREIGN PATENTS

| | | |
|---|---|---|
| 414,677 | 8/1934 | Great Britain. |
| 784,319 | 10/1957 | Great Britain. |

RICHARD W. COOKE, JR., *Primary Examiner.*

HENRY C. SUTHERLAND, FRANK L. ABBOTT, *Examiners.*

R. A. STENZEL, *Assistant Examiner.*